Jan. 26, 1960  J. E. BUXTON  2,922,307
ENGINE STARTER DRIVES
Filed Sept. 19, 1956
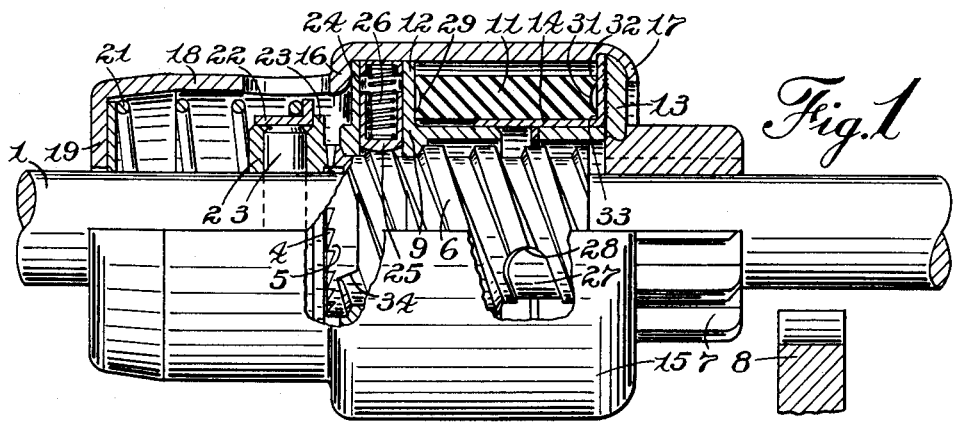
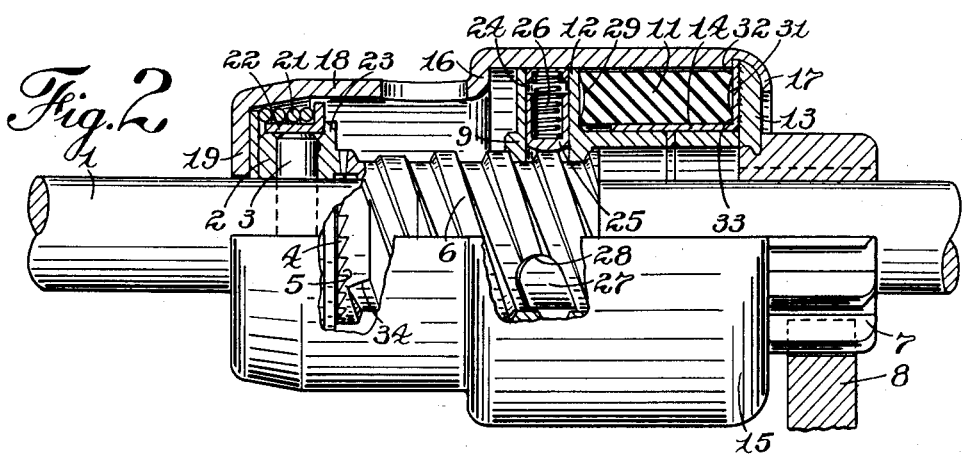
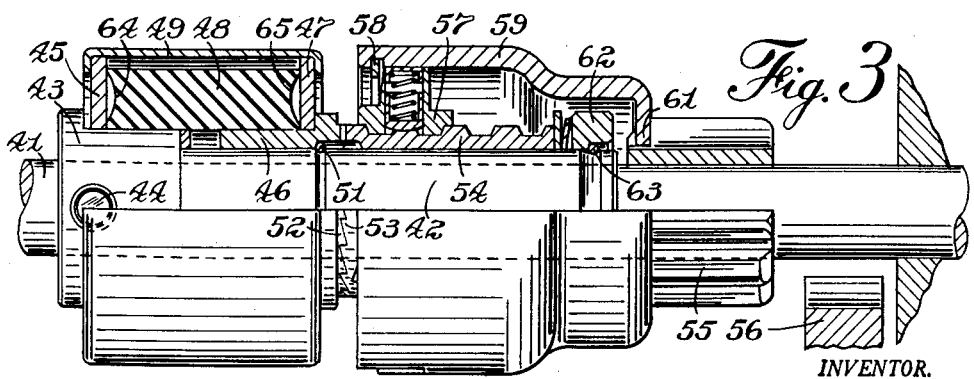
WITNESS:
Esther M. Stockton
INVENTOR.
James E. Buxton
BY Clinton L. James
ATTORNEY

United States Patent Office 2,922,307
Patented Jan. 26, 1960

2,922,307
ENGINE STARTER DRIVES

James E. Buxton, Elmira, N.Y., assignor to Bendix Aviation Corporation, Elmira Heights, N.Y., a corporation of Delaware Application September 19, 1956, Serial No. 610,809

2 Claims. (Cl. 74—7)

The present invention relates to engine starter drives and more particularly to a drive utilizing a block of elastically deformable material such as rubber for yieldingly transmitting the cranking torque.

The use of a rubber block as a yielding coupling element in a starter drive instead of the commonly used steel spring, is conducive to quiet operation and may contribute to economy in manufacture and facility of assembly. If full advantage of the properties of the material is to be taken, the arrangement should be such as to utilize its torsional elasticity as well as its resistance to compression; but in such installations as heretofore constructed it has been found that although initial operation may be very satisfactory, contamination by oil, grease and/or water tends to make the devices unreliable and in some cases even inoperative. It has therefore resulted that in all rubber-cushioned drives presently in commercial production, the rubber element is not torqued but is under compression only.

It is an object of the present invention to provide a novel starter drive incorporating a rubber-like elastic transmission element which takes full advantage of the properties of said element in the production of an efficient and reliable drive.

It is another object to provide such a device in which the elastic element is compressed and simultaneously subjected to torsional stresses.

It is another object to provide such a device which is so constructed as to effectively exclude foreign matter from the torsion-transmitting surfaces of the elastic element.

It is another object to provide such a device in which the torque-transmitting surfaces of the elastic element are formed to operate similarly to "vacuum cups", thus forming a tightly sealed attachment to the surfaces of the co-operating transmission elements.

Further objects and advantages will be apparent from the following description taken in connection with the accompanying drawing in which:

Fig. 1 is a side elevation, partly broken away and in section, of a preferred embodiment of the invention showing the parts in normal or idle position;

Fig. 2 is a similar view showing the parts in cranking position; and

Fig. 3 is a view similar to Fig. 1 of a second embodiment of the invention.

In Fig. 1 of the drawing there is illustrated a power shaft 1 on which a driving overrunning clutch member 2 is rigidly mounted as by means of a cross pin 3. The clutch member 2 is provided with teeth 4 arranged to engage cooperating clutch teeth 5 on a hollow screw shaft 6 which is slidably journalled on the power shaft 1.

A pinion 7 is also slidably journalled on the power shaft for movement into and out of mesh with a gear 8 of the engine to be started, and means for actuating the pinion from the screw shaft 6 is provided comprising a control nut 9 threaded on the screw shaft and an annular block 11 of elastically deformable material located between a radial flange 12 of the control nut and a flange member 13 rigidly mounted on the pinion in any suitable manner. A flanged thimble 14 rigidly connected to the flange member 13 as by welding or brazing, is preferably interposed to form a seat for the elastic block.

A barrel member 15 is arranged to enclose the control nut 9, elastic block 11 and pinion flange 13, and is formed with shoulders 16, 17 so spaced as to hold the elastic block under light initial compression. The barrel 15 is provided with an extension 18 terminating in an inwardly directed flange 19 providing a seat for one end of an anti-drift spring 21, the other end of which is seated on a thimble 22 which bears on the driving clutch member 2, resting against a shoulder 23 on said clutch member, and also serving to retain the pin 3 in position.

The control nut 9 is provided with one or more radial openings 24 for the reception of a detent 25 which is pressed radially inward into contact with the screw shaft by means of a calibrated spring 26. The screw shaft is formed with a notch 27 having a shoulder 28 so located as to receive the detent 25 when the drive is in cranking position, and prevent the pinion 7 from being demeshed from the engine gear 8 until the detent 25 is withdrawn by centrifugal force.

According to the present invention the flange 12 and the thimble 14 are provided with smooth radial surfaces in contact with the end surfaces of the elastic block 11, and said end surfaces of the elastic block are hollowed out as shown at 29 and 31 so as to form annular lips or ridges 32, 33 with an annular space or chamber therebetween. The initial contact of the elastic block 11 with the surfaces 12 and 14 is therefore made by these lips or ridges, and as the block is compressed, the air in the chambers 29, 31 is pressed out in such manner as to cause firm adhesion of the block to the torque-transmitting surfaces. Said chambers are thus effectively sealed in an analogous manner to the operation of the so called "vacuum cups" used for attachment of various devices to plane surfaces. This sealing attachment is brought about by the initial compression of the elastic block, and is thereafter maintained irrespective of relaxation of such compression.

In operation, starting with the parts in the positions illustrated in Fig. 1, it will be noted that the overrunning clutch teeth 4, 5 are held in initial engagement by the pressure of the anti-drift spring 21 as transmitted through the barrel 15, elastic block 11, and control nut 9 to the screw shaft 6. The normal position of the control nut 9 on the screw shaft 6 is defined by abutments 34 formed by the ends of the threads on the screw shaft.

Rotation of the power shaft 1 is transmitted from the clutch member 2 to the screw shaft, causing the control nut 9 to be traversed to the right until the travel of the control nut and pinion assembly is arrested by engagement of the flange 19 of the barrel against the clutch member 2 as shown in Fig. 2. At this time the pinion 7 is meshed with the engine gear 8, and further rotation of the power shaft causes the control nut to compress the elastic block 11 and apply torque thereto to yieldably rotate the pinion. The compression of the elastic member 11 causes the annular chambers 29, 31 to be flattened out, with consequent establishment of the sealing attachment to the surfaces 12, 14 as above described, which sealing attachment is thereafter maintained to the exclusion of any oil, water etc. to which the drive may later be subjected.

When the engine starts, the parts are returned to idle position, the pinion and barrel assembly being permitted to overrun the power shaft by virtue of the clutch connection between the screw shaft and clutch member 2.

In Fig. 3 of the drawing there is illustrated an embodiment of the invention in which the cushioning and yielding torque transmitting connection is located between the driving overrunning clutch member and the power shaft rather than between the control nut and pinion.

As there illustrated, a power shaft 41 has a hollow sleeve 42 including a driving head portion 43 fixedly mounted thereon by means of a cross pin 44; and the sleeve 42 has non-rotatably mounted thereon an annular plate member 45. A driving overrunning clutch member 46 is slidably journalled on the body of the sleeve 42, and has an annular plate member 47 non-rotatably mounted thereon. An annular block 48 of elastically deformable material is seated on the driving head 43 and overrunning clutch member 46 between the plate members 45 and 47, and is enclosed by a casing member 49 mounted at its ends on said plate members. A lock ring 51 seated in a groove in the sleeve 42 and received by a counterbore in the end of the clutch member 46 is so located as to hold the elastic member 48 under initial compression between the plate members 45 and 47.

The clutch member 46 is provided with overrunning clutch teeth 52 cooperating with similar clutch teeth 53 on the end of a hollow screw shaft 54 which is slidably journalled on the sleeve 42. A pinion 55 is slidably journalled on the power shaft 41 for movement into and out of mesh with an engine gear 56. Means for actuating the pinion from the screw shaft 54 is provided comprising a control nut 57 anchored in any suitable manner as indicated at 58 within one end of a barrel member 59, the opposite end of which is rigidly connected to the pinion 55 in any suitable manner as indicated at 61.

A stop ring 62 is retained on the end of the sleeve 42 by means of a lock ring 63, in position to limit the travel of the control nut 57 to define the meshed position of the pinion 55.

The elastic member 48 is hollowed out at its ends in the same manner as the elastic member 11 in the first embodiment of the invention so as to form annular chambers 64, 65 which, after initial compression of the elastic member, form sealing attachments with the plate members 45, 47 in the manner above described.

In the operation of this embodiment of the invention, rotation of the power shaft 41 transmitted through the sleeve 42, plate member 45, elastic member 48, plate member 47 to the driving clutch member 46 is caused to rotate the screw shaft 54 whereby the control nut and pinion assembly is traversed to the right until the meshing movement of the pinion is arrested by the engagement of the control nut 57 against the stop ring 62. Further rotation of the power shaft to rotate the pinion and crank the engine causes the screw shaft 54 and clutch member 46 to be traversed to the left by screw-jack action thus compressing the elastic block 48 and establishing its sealing attachment and torque-transmitting attachment to the plate members 45 and 47 as above set forth.

When the engine starts the parts are returned to idle position, but the sealing attachment of the elastic member 48 to the plate members 45, 47 is maintained by the vacuum-cup action so that the torsional transmission through the elastic member is not affected by exposure of the drive to oil, water etc.

Although certain structure has been shown and described in detail it will be understood that changes can be made in the precise form and arrangement of the parts without departing from the spirit of the invention as defined in the appended claims.

I claim:

1. In an engine starter drive, a motor shaft, a pinion slidably and rotatably mounted for movement into and out of mesh with an engine gear, and means for traversing the pinion into mesh responsive to acceleration of the motor shaft and for thereafter yieldably connecting the pinion to rotate with the motor shaft comprising a pair of annular transmission elements having flat opposed radial surfaces, an annular block of elastically deformable material located between said surfaces and forming the sole torque-transmitting connection between said transmission elements, and means responsive to the transmission of torque therethrough for compressing said block between said surfaces, the end surfaces of the block of elastic material which contact the radial surfaces of the transmission member being formed to initially make such contact at two narrow concentric zones located adjacent the outer and the inner peripheries of the block respectively, the surfaces of the block between said zones being hollowed out to form annular spaces which are closed by the radial surfaces of the transmission members and sealed against influx by the engagement of said concentric contacting zones with said surfaces, while permitting efflux of trapped air responsive to said compression of the block, thereby firmly attaching the ends of the block to said surfaces.

2. An engine starter drive as set forth in claim 1 in which the concentric spaced zones of contact of the elastic block with the transmission members form pneumatic seals for the annular spaces between said zones, which provide permanent vacuum-cup attachment after initial compression.

References Cited in the file of this patent

UNITED STATES PATENTS

| | | |
|---|---|---|
| Re. 20,686 | Fitz Gerald | Apr. 5, 1938 |
| 2,299,201 | Baldwin | Oct. 20, 1942 |
| 2,352,828 | Fitz Gerald | July 4, 1944 |
| 2,366,504 | Fitz Gerald | Jan. 2, 1945 |